(12) United States Patent
Budka et al.

(10) Patent No.: US 8,325,734 B2
(45) Date of Patent: Dec. 4, 2012

(54) METHOD OF THROTTLING UPLINK TRAFFIC IN A WIRELESS COMMUNICATION SYSTEM

(75) Inventors: Kenneth C. Budka, Marlboro, NJ (US); Wolfgang Lesch, Nuremberg (DE); Guenter Lothar Wolf, Nuremberg (DE)

(73) Assignee: Alcatel Lucent, Paris (FR)

( * ) Notice: Subject to any disclaimer, the term of this patent is extended or adjusted under 35 U.S.C. 154(b) by 916 days.

(21) Appl. No.: 12/076,313

(22) Filed: Mar. 17, 2008

(65) Prior Publication Data
US 2008/0165747 A1 Jul. 10, 2008

Related U.S. Application Data

(62) Division of application No. 10/123,130, filed on Apr. 17, 2002, now abandoned.

(51) Int. Cl.
*H04L 12/28* (2006.01)

(52) U.S. Cl. .................................. 370/395.4; 370/433

(58) Field of Classification Search .................. 370/337, 370/395.4, 433
See application file for complete search history.

(56) References Cited

U.S. PATENT DOCUMENTS

| | | | |
|---|---|---|---|
| 4,974,256 A | 11/1990 | Cyr et al. | |
| 5,719,859 A | 2/1998 | Kobayashi et al. | |
| 5,883,887 A | 3/1999 | Take et al. | |
| 6,018,664 A * | 1/2000 | Skarin | 455/453 |
| 6,501,745 B1 * | 12/2002 | Turina et al. | 370/337 |
| 6,956,836 B2 * | 10/2005 | Chen et al. | 370/330 |
| 7,061,878 B2 | 6/2006 | Kwon et al. | |
| 7,088,734 B2 | 8/2006 | Newberg et al. | |
| 2002/0141359 A1 * | 10/2002 | Jei | 370/329 |
| 2002/0141435 A1 * | 10/2002 | Newberg et al. | 370/442 |

* cited by examiner

*Primary Examiner* — Sai-Ming Chan
(74) *Attorney, Agent, or Firm* — Harness, Dickey & Pierce

(57) ABSTRACT

The method for throttling uplink traffic in a wireless communication system includes inserting an unassigned state flag in a downlink time slot. A state flag indicates, when assigned, which mobile station should transmit during an uplink time slot associated with the downlink time slot.

14 Claims, 1 Drawing Sheet

METHOD OF THROTTLING UPLINK TRAFFIC IN A WIRELESS COMMUNICATION SYSTEM

PRIORITY STATEMENT

This application is a divisional application of and claims the benefit of priority under 35 U.S.C. §120 from application Ser. No. 10/123,130 filed Apr. 17, 2002, now abandoned the contents of which are hereby incorporated by reference in their entirety.

BACKGROUND

1. Field

The present invention relates to the field of telecommunications; and more particularly, controlling uplink traffic in a wireless communication system.

2. Description of Related Art

Data transfer between mobile stations and base stations in General Packet Radio Service (GPRS) and Enhanced General Packet Radio Service (EGPRS) networks is accomplished using a stream of fixed-length, physical layer blocks. In addition to a number of payload bits, each block carries parity bits generated by a forward error correction code to protect the payload against transmission errors.

In EGPRS and GPRS networks, blocks are transferred over the air interface using unidirectional, physical layer connections known as Temporary Block Flows (TBFs). When the wireless data network wishes to transmit data packets to a mobile station, a downlink Temporary Block Flow is established. During downlink TBF establishment, the wireless data network assigns the mobile station a temporary address known as a Temporary Flow Indicator (TFI). The TFI is included in the header of each downlink block, thereby allowing mobile stations to easily determine which blocks are intended for it, and which are intended for other mobiles with active downlink TBFs. The TBFs are maintained only as long as there are blocks to be transferred. When the network has no more blocks to send to a mobile station, the downlink TBF is torn down, allowing the network to re-use the TFI for other mobiles.

Mobile stations wishing to transmit data packets to the network must first request establishment of an uplink TBF. If the network has sufficient uplink bandwidth to satisfy the request, the network establishes an uplink Temporary Block Flow, and tells the mobile which uplink timeslots it is permitted to use.

Uplink timeslots are shared among all mobiles with active uplink Temporary Block Flows. To coordinate uplink transmissions among mobiles with active uplink TBFs on the same timeslot, GPRS and EGPRS networks employ a three-bit long Uplink State Flag. During uplink TBF establishment, the network assigns each mobile an Uplink State Flag (USF) for each of its assigned timeslots. At any time, no two mobiles sharing the same uplink timeslot will have the same USF flag value. The network includes a USF flag in the header of each downlink block on a timeslot. When a mobile station detects its USF flag in a downlink block on one of its assigned timeslots, the mobile station begins transmitting uplink blocks on that timeslot during the following uplink block—roughly 20 ms after the mobile "sees" its USF flag in a downlink block. When a mobile's uplink TBF is torn down, the network is free to reassign the USF flags that were assigned to the mobile.

Data traffic surges in wireless data networks can strain processing and buffering capacity of wireless data network equipment. An effective overload defense used to protect network resources during temporary and sustained overloads is for the network to drop new requests for Temporary Block Flows. Simply denying requests for new TBFs does not provide any defense against overloads caused by traffic carried on existing TBFs, however. And, because network resources have already been invested in setting up existing TBFs, and partially transmitting packets between the network and mobile stations, tearing down existing TBFs is an unattractive defense against overload. In addition, when TBFs are torn down, mobiles will retry shortly thereafter, thus, generating even more load.

SUMMARY

In the method of throttling uplink traffic according to the present invention, an unassigned uplink state flag is sent in a downlink time slot to reduce the amount of uplink traffic. Because no mobile stations have been assigned the unassigned uplink state flag, no mobile station will transmit during the corresponding uplink time slot. By increasing or decreasing the number of unassigned uplink state flags sent in time slots over a measurement interval, uplink traffic is decreased and increased, respectively. In one embodiment, the number of time slots in a measurement interval containing unassigned uplink state flags is determined based on the severity of overload in the network.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

The inventors have recognized that if an unassigned uplink state flag is sent in a downlink time slot, then mobile stations will not transmit during the corresponding uplink time slot—roughly 20 ms after the unassigned uplink state flag is seen by the mobile stations. Accordingly, uplink traffic is controlled according to the method of the present invention by sending unassigned uplink state flags in downlink timeslots. As the number of time slots including unassigned uplink state flags during a measurement interval increases, the uplink traffic decreases. And, as the number of time slots including unassigned uplink state flags during a measurement interval decreases, the uplink traffic increases. By tying the number of unassigned uplink state flags to the severity of uplink traffic overload in the network, the uplink traffic is throttled to more acceptable levels.

Figure 1:
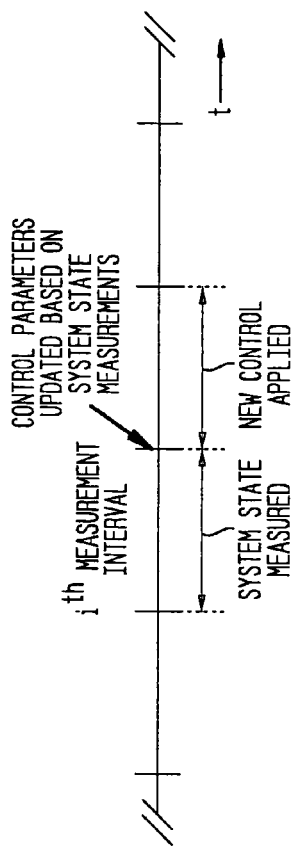
FIG. 1 illustrates state measurements made during fixed-length measurement intervals.
Figure 2:
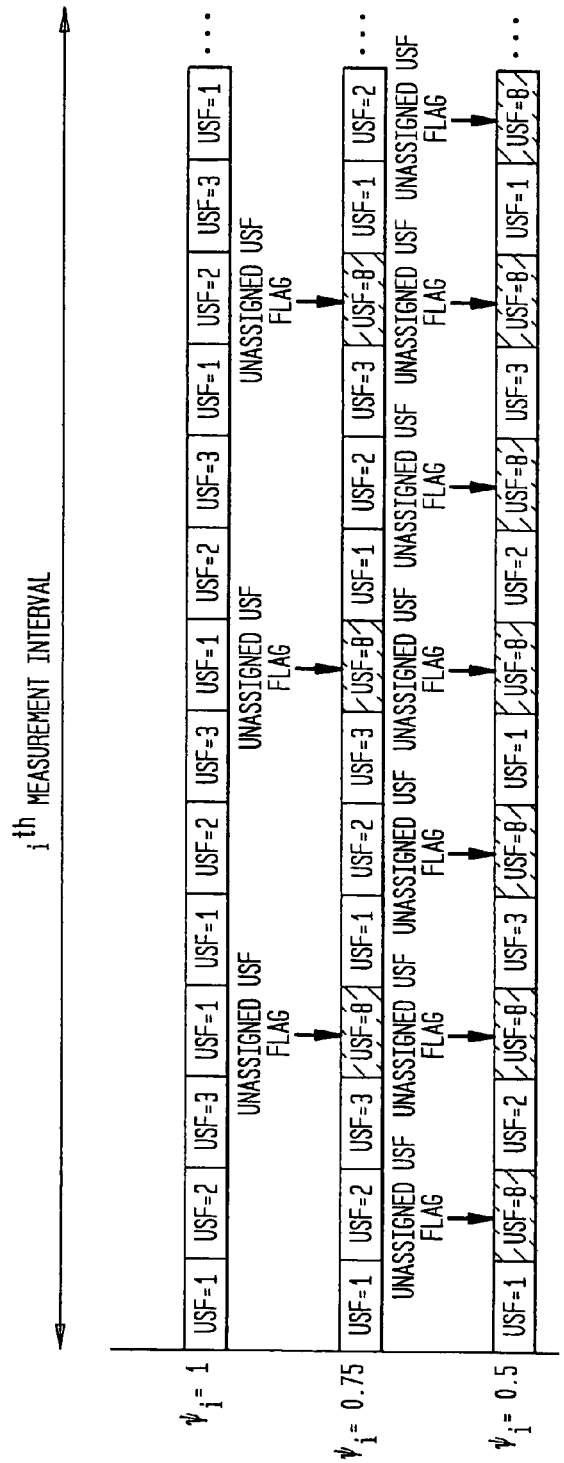
FIG. 2 illustrates selecting uplink state flags based on different values of an overload parameter.

One general embodiment of throttling uplink traffic based on overload conditions will now be described with respect to FIGS. 1 and 2. Assume the well-known framework where time is divided into a series of measurement intervals of fixed duration, with a typical value of 3-5 seconds as shown in FIG. 1, and that each measurement interval is divided into a number of fixed length time slots. Both the measurement interval (sometimes referred to as a frame) and the time slots are usually specified in the standard governing the wireless communication system, and the present invention is intended as applicable regardless of the chosen standard. During each measurement interval, measurements are made which determine whether the system under control is in overload, and, if the network is in overload, a measurement of the severity of the overload is made. Based on the severity measurement, a control parameter $\psi_i$, representing the fraction of load that will be allowed into the system during the $i^{th}$ measurement interval, is updated. When no overload condition exists, the overload monitoring process sets $\psi_i=1$. When $\psi_i=1$, all uplink blocks may be used by mobile stations with active uplink TBFs during the $i^{th}$ measurement interval. When the overload monitoring process detects an overload, it sets $\psi_i$ to a value less than one. By decreasing the value of $\psi_i$, the overload monitoring process can throttle higher volumes of uplink traffic.

At the end of the $i^{th}$ measurement interval, the fraction of load that will be allowed into the system during the next interval is updated based on $\psi_i$ and the system state measurement made over the $i^{th}$ interval. One way to do this is: $\psi_{i+1}=\min\{\psi_i+\Delta\psi_{up},1\}$, if the system was not overloaded during the ith measurement interval $\psi_{i+1}=\max\{\psi_i-\Delta\psi,0\}$, otherwise, where $0<\Delta\psi_{up},\Delta\psi<1$. It may also be advantageous to allow the size of $\Delta\psi$ to depend on the severity of the overload—larger values of $\Delta\psi$ being used when state measurements show the system is in states corresponding to heavy overloads. An example of a measurement that could be used to determine overload state is the average processing load of a CPU in the network (e.g., at a base station) over the measurement interval. The system is declared to be in overload if the average CPU load exceeds a pre-determined threshold. The value of $\psi_i$ is the set based on an amount by which the processing load exceeds the pre-determined threshold. This is accomplished by mapping the processing load to a value of $\psi_i$ using an empirically determined look-up table or equation.

The value of $\psi_i$ is then used to determine the fraction of downlink blocks which should contain USF flags already assigned to users. A fraction $1-\psi_i$ of downlink blocks will be assigned a USF flag not belonging to a mobile with an active uplink TBF. FIG. 2 illustrates the effect of $\psi_i$ on the assignment of USF flags.

Determining when to insert a USF flag not assigned to a mobile for an arbitrary value of $\psi_i$ can be done using a bit sequence called a go/no-go sequence. A go-no/go sequence is a sequence S of ones and zeroes with $n^{th}$ term $S_n$ defined as $\lfloor(n+1)\psi\rfloor-\lfloor n\psi\rfloor$, where $\psi$ is the fraction of ones which appear in the sequence and $\lfloor x \rfloor$ denotes the largest integer not exceeding x.

By inserting unassigned uplink state flags in the downlink time slots, the network can reduce uplink traffic. And, by controlling the presence of the uplink state flags in the downlink time slots, the network can throttle the uplink traffic based on, for example, load on the network.

Each time a USF flag is to be inserted into the $n^{th}$ downlink block transmitted during the $i^{th}$ measurement interval, the value of $S_n$ is generated (with $\psi$ set to $\psi_i$). If $S_n=1$, a USF flag belonging to a mobile with an active uplink TBF is inserted into the $n^{th}$ downlink block transmitted during measurement interval i. If $S_n=0$, a USF flag not belonging to a mobile with an active uplink TBF is inserted into the $n^{th}$ downlink block.

By inserting unassigned uplink state flags in the downlink time slots, the network can reduce uplink traffic. And, by controlling the presence of the uplink state flags in the downlink time slots, the network can throttle the uplink traffic based on, for example, load on the network.

The invention being thus described, it will be obvious that the same may be varied in many ways. Such variations are not to be regarded as a departure from the spirit and scope of the invention, and all such modifications are intended to be included within the scope of the following claims.

We claim:

1. A method for controlling uplink traffic in a wireless communication system, comprising:
    inserting an uplink state flag into a downlink time slot based on a severity of network overload, the inserted uplink state flag not being currently assigned to a mobile station, such that inclusion of the inserted uplink state flag in the downlink time slot indicates that no mobile station is permitted to transmit during a corresponding uplink time slot.

2. The method of claim 1, wherein
    downlink and uplink communication are each divided into intervals of a predetermined number of time slots; and
    the inserting step inserts the uplink state flag in at least one of the predetermined number of downlink time slots.

3. The method of claim 2, wherein the inserting step comprises:
    receiving a network overload indicator;
    determining the predetermined number of downlink slots based on the network overload indicator; and
    loading an uplink state flag in each of the predetermined number of downlink time slots.

4. The method of claim 1, wherein the inserting step inserts uplink state flags based on a received network overload parameter.

5. The method of claim 1, wherein the inserting step inserts the uplink state flag at a frequency based on a received network overload parameter.

6. The method of claim 5, wherein the network overload parameter is periodically received.

7. The method of claim 1, wherein the uplink state flag is used in at least one of a General Packet Radio Service communication system and an Enhanced General Packet Radio Service communication system.

8. The method of claim 3, wherein
    the determining step sets each element of a bit sequence to a first bit value or a second bit value based on the network overload indicator, wherein a number of bits in the bit sequence equals the predetermined number of downlink time slots and wherein each bit in the bit sequence corresponds to a one of the predetermined number of downlink time slots; and
    the loading step loads an unassigned uplink state flag in the one of the predetermined number of downlink time slots when a corresponding bit in the bit sequence is the first bit value and loads an assigned uplink state flag in the one of the predetermined number of downlink time slots otherwise.

9. The method of claim 3, wherein the network overload indicator is determined by,
    measuring, during a first measurement interval, whether the wireless communication system is in overload; and
    measuring the severity of network overload in the first measurement interval, the network overload indicator representing a fraction of a permissible uplink load in a second measurement interval.

10. The method of claim 9, wherein when no network overload exists, all uplink time slots are designated as eligible to be used by mobile stations in the second measurement interval.

11. The method of claim 9, wherein the fraction of the uplink load that will be permitted in a third measurement interval is updated based on the network overload indicator and a measurement of the severity of network overload in the second measurement interval.

12. The method of claim 9, wherein measuring the severity of network overload in the measurement interval is measured by calculating an average processing load of a CPU in the wireless communication system over the measurement interval.

13. The method of claim 12, wherein the wireless communication system is in overload if the average processing load of the CPU exceeds a threshold.

14. The method of claim 13, wherein the network overload indicator is set based on an amount by which the average processing load of the CPU exceeds the threshold.

* * * * *